United States Patent
Nagai et al.

(10) Patent No.: US 11,290,419 B2
(45) Date of Patent: Mar. 29, 2022

(54) GATEWAY APPARATUS, METHOD, PROGRAM, AND RECORDING MEDIUM

(71) Applicant: NEC CORPORATION, Tokyo (JP)

(72) Inventors: Eigo Nagai, Tokyo (JP); Toshiyuki Tamura, Tokyo (JP); Atsushi Shiroyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 51 days.

(21) Appl. No.: 17/040,713

(22) PCT Filed: Mar. 5, 2019

(86) PCT No.: PCT/JP2019/008563
§ 371 (c)(1),
(2) Date: Sep. 23, 2020

(87) PCT Pub. No.: WO2019/188033
PCT Pub. Date: Oct. 3, 2019

(65) Prior Publication Data
US 2021/0014193 A1    Jan. 14, 2021

(30) Foreign Application Priority Data
Mar. 28, 2018    (JP) .............................. JP2018-061706

(51) Int. Cl.
*H04L 29/12*    (2006.01)
*H04W 80/04*    (2009.01)
(Continued)

(52) U.S. Cl.
CPC ......... *H04L 61/2007* (2013.01); *H04W 76/23* (2018.02); *H04W 80/04* (2013.01); *H04W 88/16* (2013.01)

(58) Field of Classification Search
None
See application file for complete search history.

(56) References Cited

U.S. PATENT DOCUMENTS

| | | |
|---|---|---|
| 2017/0048876 A1 | 2/2017 | Mahindra et al. |
| 2018/0249317 A1 | 8/2018 | Kurasugi et al. |
| (Continued) | | |

FOREIGN PATENT DOCUMENTS

| | | | |
|---|---|---|---|
| CN | 108243409 A | * | 7/2018 |
| EP | 3 429 260 A1 | | 1/2019 |
| (Continued) | | | |

OTHER PUBLICATIONS

Huawei, Hisilicon, "Session management for scenarios with branching functions", SA WG2 Meeting #117-BIS, S2-164516, Aug. 29-Sep. 2, 2016, pp. 1-7, Sanya, China.

(Continued)

*Primary Examiner* — Kenny S Lin
(74) *Attorney, Agent, or Firm* — Sughrue Mion, PLLC

(57) ABSTRACT

An example object is to appropriately provide, to a terminal apparatus, both a service via a packet data network gateway and a service for Mobile Edge Computing (MEC) in an Evolved Packet Core (EPC) network. A first communication processing unit 131 transfers data between a terminal apparatus 500 and a packet data network gateway 200 when a destination address of the data for the terminal apparatus 500 is an address other than an address of an MEC server 300, and a second communication processing unit 133 transfers data between the terminal apparatus 500 and the MEC server 300 when a destination address of data for the terminal apparatus 500 is an address of the MEC server 300.

7 Claims, 7 Drawing Sheets

(51) Int. Cl.
     *H04W 88/16*     (2009.01)
     *H04L 61/5007*   (2022.01)
     *H04W 76/23*     (2018.01)

(56)                            References Cited

U.S. PATENT DOCUMENTS

| | | |
|---|---|---|
| 2018/0352594 A1 | 12/2018 | Iwai et al. |
| 2019/0254108 A1* | 8/2019 | Iwai ................... H04W 8/26 |
| 2019/0380025 A1* | 12/2019 | Pentakota ............. H04L 63/306 |

FOREIGN PATENT DOCUMENTS

| | | |
|---|---|---|
| WO | 2017/037776 A1 | 3/2017 |
| WO | 2017/043204 A1 | 3/2017 |
| WO | 2017/099165 A1 | 6/2017 |
| WO | 2017/151025 A1 | 9/2017 |
| WO | 2017/152723 A1 | 9/2017 |

OTHER PUBLICATIONS

International Search Report for PCT/JP2019/008563 dated May 28, 2018 (PCT/ISA/210).
Extended European Search Report for EP Application No. EP19775662.0 dated Feb. 16, 2021.
Cisco, "MEC Location Management", Jun. 10, 2016, pp. 1-10, XP055732326.

* cited by examiner

GATEWAY APPARATUS, METHOD, PROGRAM, AND RECORDING MEDIUM

CROSS REFERENCE TO RELATED APPLICATIONS

This application is a National Stage of International Application No. PCT/JP2019/008563 filed Mar. 5, 2019, claiming priority based on Japanese Patent Application No. 2018-061706 filed Mar. 28, 2018.

BACKGROUND

Technical Field

The present invention relates to a gateway apparatus, a method, a program, and a recording medium.

Background Art

For example, as described in PTL 1, Mobile Edge Computing (MEC) provides, to each application developer and each content provider, a cloud computing capability and information technology (IT) service environment in a neighboring radio access network of each mobile subscriber. In this environment, it is possible to provide a direct access to radio network information (subscriber location, cell load, and the like) that can be used by a corresponding application and service, in addition to ultra-low delay and broad bandwidth.

CITATION LIST

Patent Literature

[PTL 1] WO 2017/099165

SUMMARY

Technical Problem

Although some methods for implementing MEC may exist as described below, there is no standard method as one defined in the 3rd Generation Partnership Project (3GPP).

For example, a method of establishing deep packet inspection (DPI) in an S1 section and changing a route of an IP packet having an address for an MEC service has the following problems. Specifically, since the location of user equipment (UE) is unknown in a service provision area for the MEC service, the UE is not able to receive a downlink packet from a network.

When a PGW is installed in a service area for the MEC service and the PGW operates with mobility control, the UE can receive a downlink packet but requires reconfiguration of a PDN session. In other words, in this case, an influence on the service occurs in terms that an IP address is reassigned to the UE. In the case of installing the PGW in the service area for the MEC service, facilities such as Internetwork Packet Exchange (IPX) are required in the service area for the MEC service in order to maintain a connection for the Internet.

An example object of the present invention is to provide a gateway apparatus, a method, a program, and a recording medium that make it possible to appropriately provide, to a terminal apparatus, both a service via a packet data network gateway and a service by Mobile Edge Computing (MEC) in an Evolved Packet Core (EPC) network.

Solution to Problem

A gateway apparatus according to an example aspect of the present invention includes a first communication processing unit configured to perform communication with a packet data network gateway configuring an address for a terminal apparatus in an Evolved Packet Core (EPC) network, a second communication processing unit configured to perform communication with an MEC server providing a service by Mobile Edge Computing (MEC), and a managing unit configured to manage information related to an address of the MEC server, wherein the first communication processing unit is configured to transfer data between the terminal apparatus and the packet data network gateway when a destination address of data for the terminal apparatus is an address other than an address of the MEC server, and the second communication processing unit is configured to transfer data between the terminal apparatus and the MEC server when a destination address of data for the terminal apparatus is an address of the MEC server.

In the above-described example aspect, the address of the MEC server and the address other than the address of the MEC server are managed and compared, to thereby determine a data transfer destination. Here, the addresses to be used for this determination may be an Internet protocol version 4 (IPv4) address, an IPv4 address group, an Internet protocol version 6 (IPv6) address, an IPv6 address group, a port number used in a transport layer, a port number group used in a transport layer, or information used for service limitation in a higher layer.

A method according to an example aspect of the present invention includes performing communication with a packet data network gateway configuring an address for a terminal apparatus in an Evolved Packet Core (EPC) network; communication with an MEC server providing service by Mobile Edge Computing (MEC), and managing information related to an address of the MEC server, wherein the communication with the packet data network gateway includes transferring data between the terminal apparatus and the packet data network gateway when a destination address of data for the terminal apparatus is an address other than an address of the MEC server, and the communication with an MEC server includes transferring data between the terminal apparatus and the MEC server when a destination address of data for the terminal apparatus is an address of the MEC server.

A program according to an example aspect of the present invention is a program that causes a processor to execute performing communication with a packet data network gateway configuring an address for a terminal apparatus in an Evolved Packet Core (EPC) network, performing communication with an MEC server providing service by Mobile Edge Computing (MEC), and managing information related to an address of the MEC server, wherein the communication with the packet data network gateway includes transferring data between the terminal apparatus and the packet data network gateway when a destination address of data for the terminal apparatus is an address other than an address of the MEC server, and the communication with an MEC server includes transferring data between the terminal apparatus and the MEC server when a destination address of data for the terminal apparatus is an address of the MEC server.

A recording medium according to an example aspect of the present invention is a non-transitory computer readable recording medium storing a program that causes a processor to execute performing communication with a packet data network gateway configuring an address for a terminal apparatus in an Evolved Packet Core (EPC) network, performing communication with an MEC server providing service by Mobile Edge Computing (MEC), and managing information related to an address of the MEC server, wherein the communication with the packet data network gateway includes transferring data between the terminal apparatus and the packet data network gateway when a destination address of data for the terminal apparatus is an address other than an address of the MEC server, and the communication with an MEC server includes transferring data between the terminal apparatus and the MEC server when a destination address of data for the terminal apparatus is an address of the MEC server.

Advantageous Effects of Invention

According to the present invention, it is possible to appropriately provide, to a terminal apparatus, both a service via a packet data network gateway and a service by MEC in an EPC network. Note that, according to the present invention, instead of or together with the above effects, other effects may be exerted.

DESCRIPTION OF THE EXAMPLE EMBODIMENTS

Figure 1:
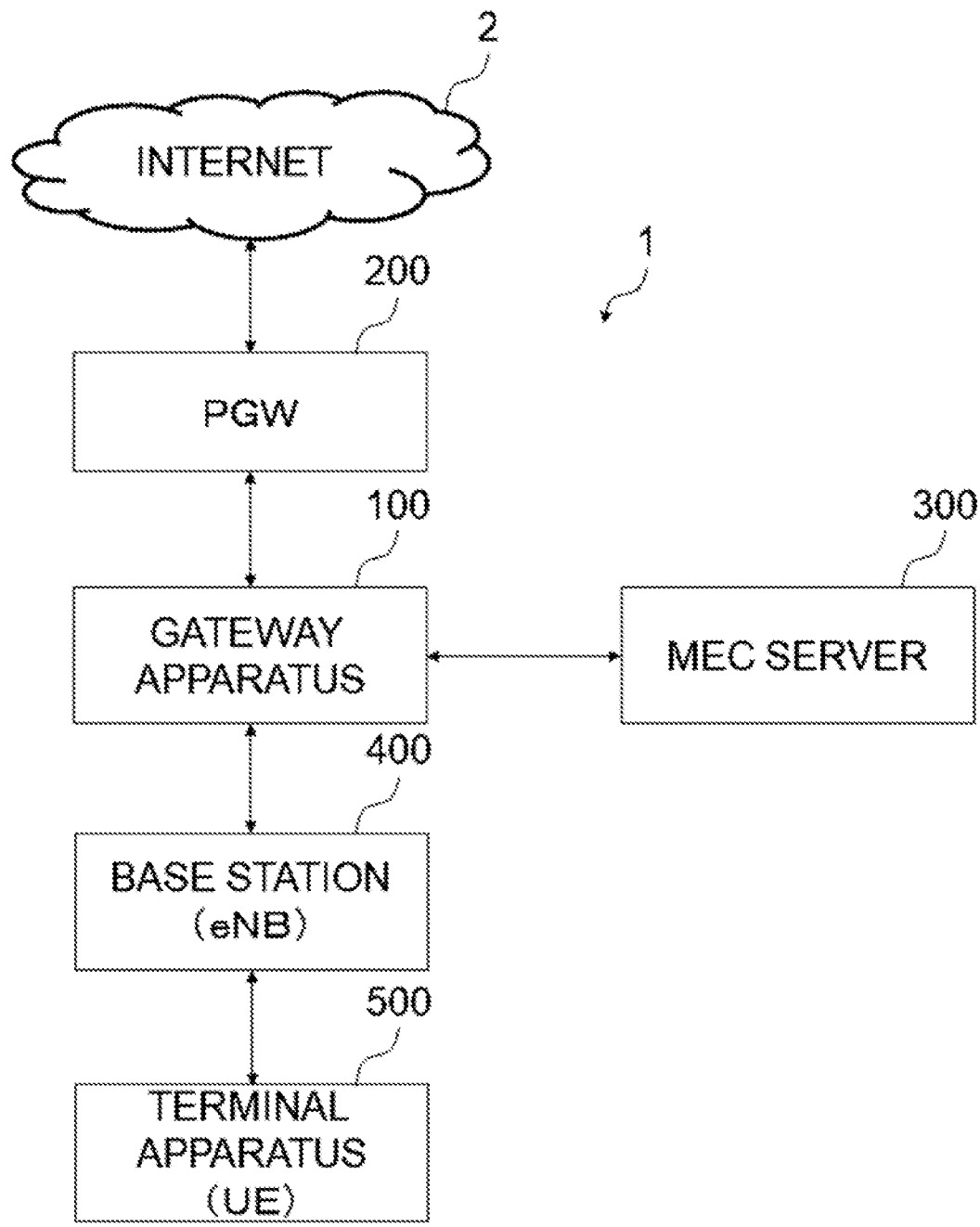
FIG. 1 is an explanatory diagram illustrating an example of a schematic configuration of a system 1 according to example embodiments of the present invention.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of the Present Invention
2. Configuration of System
3. First Example Embodiment
3.1. Configuration of Gateway Apparatus 100
3.2. Technical Features
3.3. Examples
4. Second Example Embodiment
4.1. Configuration of Gateway Apparatus 100
4.2. Technical Features
5. Other Example Aspects 1. Overview of Example Embodiments of the Present Invention First, an overview of example embodiments of the present invention will be described.
(1) Technical Issues
Mobile edge computing (MEC) provides, to each application developer and each content provider, a cloud computing capability and information technology (IT) service environment in a neighboring radio access network of each mobile subscriber. In this environment, it is possible to provide a direct access to radio network information (subscriber location, cell load, and the like) that can be used by a corresponding application and service, in addition to ultra-low delay and broad bandwidth.

Although some methods for implementing MEC may exist as described below, there is no standard method as one defined in the 3rd Generation Partnership Project (3GPP).

For example, a method of establishing deep packet inspection (DPI) in an S1 section and changing a route of an IP packet having an address for an MEC service has the following problems. Specifically, since the location of user equipment (UE) is unknown in a service provision area for the MEC service, the UE is not able to receive a downlink packet from a network.

When a PGW is installed in a service area for the MEC service and the PGW operates with mobility control, the UE can receive a downlink packet but requires reconfiguration of a PDN session. In other words, in this case, an influence on the service occurs in terms that an IP address is reassigned to the UE. In the case of installing the PGW in the service area for the MEC service, facilities such as Inter-network Packet Exchange (IPX) are required in the service area for the MEC service in order to maintain a connection for the Internet.

An example object of the present example embodiment is to make it possible to appropriately provide, to a terminal apparatus, both a service via a packet data network gateway and a service for Mobile Edge Computing (MEC) in an Evolved Packet Core (EPC) network.

(2) Technical Features
In example embodiments of the present invention, for example, a gateway apparatus performs communication with a packet data network gateway configuring an address for a terminal apparatus in an Evolved Packet Core (EPC) network. The gateway apparatus also performs communication with an MEC server providing a service by Mobile Edge Computing (MEC). The gateway apparatus also manages information related to an address of the MEC server. Moreover, the gateway apparatus transfers data between the terminal apparatus and the packet data network gateway when a destination address of data for the terminal apparatus is an address other than an address of the MEC server, and transfers data between the terminal apparatus and the MEC server when a destination address of data for the terminal apparatus is an address of the MEC server.

As described above, in the example embodiments of the present invention, the address of the MEC server and the address other than the address of the MEC server are managed and compared, to thereby determine a data transfer destination. The addresses to be used for this determination may be an Internet protocol version 4 (IPv4) address, an IPv4 address group, an Internet protocol version 6 (IPv6)

address, an IPv6 address group, a port number used in a transport layer, a port number group used in a transport layer, or information used for service limitation in a higher layer.

With this, it is possible, for example, to appropriately provide, to a terminal apparatus, both a service via a packet data network gateway and a service by MEC in an EPC network.

Note that the above-described technical features are concrete examples of the example embodiments of the present invention, and the example embodiments of the present invention are, of course, not limited to the above-described technical features.

2. Configuration of System

With reference to FIG. 1, an example of a configuration of a system 1 according to the example embodiments of the present invention will be described. FIG. 1 is an explanatory diagram illustrating an example of a schematic configuration of the system 1 according to the example embodiments of the present invention. With reference to FIG. 1, the system 1 includes a gateway apparatus 100, a packet data network gateway 200 (also referred to as a PGW 200 below), a Mobile Edge Computing server 300 (also referred to as an MEC server 300), a base station 400, and a terminal apparatus 500.

For example, the system 1 is a system conforming to the 3rd Generation Partnership Project (3GPP) standards/specifications. More specifically, for example, the system 1 may be a system conforming to LTE/LTE-Advanced and/or System Architecture Evolution (SAE) specifications/standards. Alternatively, the system 1 may be a system conforming to fifth-generation (5G)/New Radio (NR) standards/specifications. The system 1 is, of course, not limited to these examples.

(1) Gateway Apparatus 100

The gateway apparatus 100 is a core network node and is configured to perform communication with each of the PGW 200, the MEC server 300, and the base station 400 via a network.

(2) PGW 200

The PGW 200 is a connection point with the Internet 2, i.e., a connection point with a packet data network (PDN), and is a gateway configured to perform IP address allocation and packet transfer to a serving gateway (SGW). As illustrated in FIG. 1, the PGW 200 is configured to perform communication with the gateway apparatus 100 via a network.

(3) MEC Server 300

The MEC server 300 is a server that provides the MEC service, is connected to the gateway apparatus 100 so as to be able to communicate with the gateway apparatus 100, and is configured to perform transmission and/or reception of data to be used for the MEC service to and/or from the terminal apparatus 500 via the gateway apparatus 100 and the base station 400.

(4) Base Station 400

The base station 400 is a radio access network (RAN) node and is configured to perform wireless communication with terminal apparatuses (e.g., the terminal apparatus 500) located in a coverage area of the base station 400.

For example, the base station 400 may be an evolved Node B (eNB) or a generation Node B (gNB) in 5G.

(5) Terminal Apparatus 500

The terminal apparatus 500 performs wireless communication with a base station. For example, the terminal apparatus 500 performs wireless communication with the base station 400 in a case of being located in the coverage area of the base station 400. For example, the terminal apparatus 500 is user equipment (UE).

3. First Example Embodiment

Next, with reference to FIGS. 2 to 6, a description will be given of a first example embodiment of the present invention.

3.1. Configuration of Gateway Apparatus 100

Figure 2:
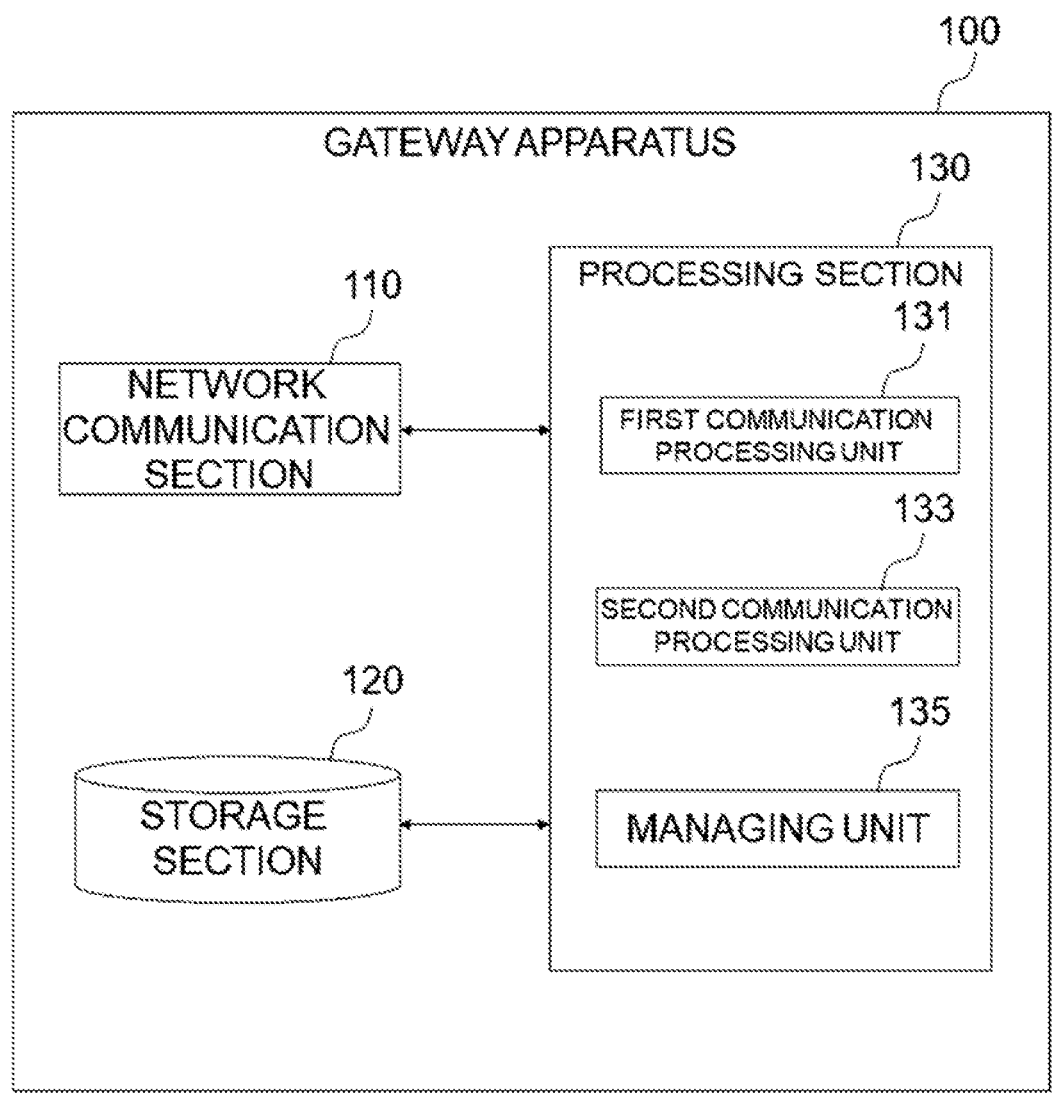
FIG. 2 is a block diagram illustrating an example of a schematic configuration of a gateway apparatus 100 according to a first example embodiment.

Next, with reference to FIG. 2, an example of a configuration of the gateway apparatus 100 according to the first example embodiment will be described. FIG. 2 is a block diagram illustrating an example of a schematic configuration of the gateway apparatus 100 according to the first example embodiment. With reference to FIG. 2, the gateway apparatus 100 includes a network communication section 110, a storage section 120, and a processing section 130.

(1) Network Communication Section 110

The network communication section 110 receives a signal from a network and transmits a signal to the network.

(2) Storage Section 120

The storage section 120 temporarily or permanently stores programs (instructions) and parameters for operations of the gateway apparatus 100 as well as various data. The program includes one or more instructions for the operations of the gateway apparatus 100.

(3) Processing Section 130

The processing section 130 provides various functions of the gateway apparatus 100. The processing section 130 includes a first communication processing unit 131, a second communication processing unit 133, and a managing unit 135. Note that the processing section 130 may further include constituent elements other than these constituent elements. In other words, the processing section 130 may also perform operations other than the operations of these constituent elements. Concrete operations of the first communication processing unit 131, the second communication processing unit 133, and the managing unit 135 will be described later in detail.

For example, the processing section 130 (first communication processing unit 131) communicates with the packet data network gateway 200 via the network communication section 110. The processing section 130 (second communication processing unit 133) communicates with the MEC server 300 via the network communication section 110.

(4) Implementation Example

The network communication section 110 may be implemented with a network adapter and/or a network interface card, and the like. The storage section 120 may be implemented with a memory (e.g., a nonvolatile memory and/or a volatile memory) and/or a hard disk, and the like. The processing section 130 may be implemented with one or more processors, such as a baseband (BB) processor and/or a different kind of processor. The first communication processing unit 131, the second communication processing unit 133, and the managing unit 135 may be implemented with the same processor or may be implemented with separate processors. The memory (storage section 120) may be included in the one or more processors or may be provided outside the one or more processors.

The gateway apparatus 100 may include a memory configured to store a program (instructions) and one or more processors that can execute the program (instructions). The one or more processors may execute the program and thereby perform operations of the processing section 130 (operations of the first communication processing unit 131, the second communication processing unit 133, and/or the managing unit 135). The program may be a program for causing the processor(s) to perform operations of the processing section 130 (operations of the first communication processing unit 131, the second communication processing unit 133, and/or the managing unit 135).

Note that the gateway apparatus 100 may be virtual. In other words, the gateway apparatus 100 may be implemented as a virtual machine. In this case, the gateway apparatus 100 (the virtual machine) may operate as a physical machine (hardware) including a processor, a memory, and the like, and a virtual machine on a hypervisor.

3.2. Technical Features

Next, technical features of the first example embodiment will be described.

The gateway apparatus 100 (first communication processing unit 131) performs communication with a packet data network gateway 200 configuring an address for a terminal apparatus (e.g., the terminal apparatus 500) in an EPC network. The gateway apparatus 100 (second communication processing unit 133) performs communication with the MEC server 300 providing the MEC service. The gateway apparatus 100 (managing unit 135) manages information related to an address of the MEC server 300.

The gateway apparatus 100 (first communication processing unit 131) transfers data between the terminal apparatus (e.g., the terminal apparatus 500) and the packet data network gateway 200 when a destination address of data for the terminal apparatus (e.g., the terminal apparatus 500) is an address other than an address of the MEC server 300. The gateway apparatus 100 (second communication processing unit 133) transfers data between the terminal apparatus (the terminal apparatus 500) and the MEC server 300 when a destination address of data for the terminal apparatus (e.g., the terminal apparatus 500) is the address of the MEC server.

As described above, the gateway apparatus 100 manages and compares the address of the MEC server and the address other than the address of the MEC server to thereby determine a data transfer destination. Each of the addresses to be used for this determination may be an Internet protocol version 4 (IPv4) address, an IPv4 address group, an Internet protocol version 6 (IPv6) address, an IPv6 address group, a port number used in a transport layer, a port number group used in a transport layer, or information used for service limitation in a higher layer.

For example, the gateway apparatus 100 (the first communication processing unit 131, the second communication processing unit 133, and the managing unit 135) functions as a mobility management entity (MME), an SGW and a PGW for the service area of the MEC server 300.

(1) Address

The address for the terminal apparatus is specifically an Internet protocol (IP) address assigned to the terminal apparatus (e.g., the terminal apparatus 500) by the PGW 200.

The address of the MEC server 300 is specifically the IP address of the MEC server 300. The information related to the address of the MEC server 300 managed by the gateway apparatus 100 (managing unit 135) is, for example, information related to a correspondence relationship between the IP address and the domain name of the MEC server 300 recognizable in the gateway apparatus 100 (e.g., a DNS server).

(2) Service Area of MEC Server 300

The service area of the MEC server 300 is specifically an area identified by a tracking area identifier.

As described above, when the service area of the MEC server 300 is identified by the tracking identifier, the gateway apparatus 100 performs the following processing in the processing related to tracking area update, for example.

For example, the gateway apparatus 100 (managing unit 135) acquires the information related to the address of the MEC server 300 when a tracking area update request for the service area of the MEC server 300 is received from the terminal apparatus 500, and thereby manages the information.

The gateway apparatus 100 (first communication processing unit 131), for example, transmits a Modify Bearer Request message to the packet data network gateway 200 when a tracking area update request for the service area of the MEC server 300 is received from the terminal apparatus 500.

Subsequently, the gateway apparatus 100 (first communication processing unit 131) receives a Modify Bearer Response message from the packet data network gateway 200. Consequently, an S5 interface is configured between the gateway apparatus 100 and the packet data network gateway 200. In other words, after the Modify Bearer Response message is received from the packet data network gateway 200, the gateway apparatus 100 (first communication processing unit 131) performs communication with the packet data network gateway 200 by using the S5 interface.

3.3. Examples

Next, an example according to the first example embodiment will be described.

(1) Configuration Example of Network

Figure 3:
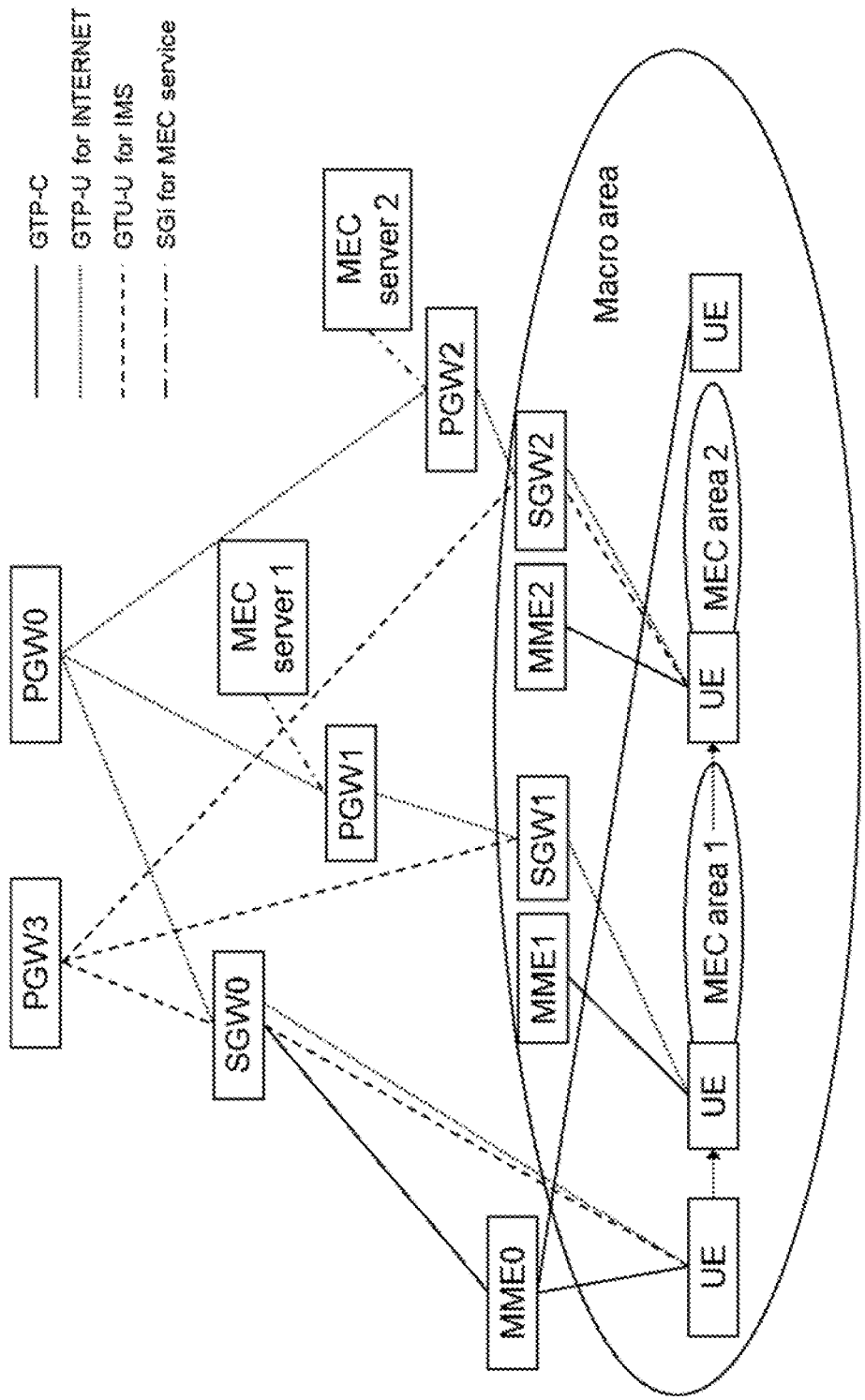
FIG. 3 is a diagram illustrating an example of a schematic configuration of an EPC network according to an example.

FIG. 3 is a diagram illustrating an example of a schematic configuration of an EPC network according to an example. In the example illustrated in FIG. 3, MME0 represents a mobility management entity configured to control a base station in a Macro area, and SGW0 represents a serving gateway for transmitting a signal for a terminal apparatus (e.g., UE) in the Macro area.

PGW0 or PGW3 corresponds to the above-described packet data network gateway 200.

MEC Server 1 or MEC Server 2 corresponds to the above-described MEC server 300.

A set of MME1, SGW1, and PGW1 or a set of MME2, SGW2, and PGW2 corresponds to the above-described gateway apparatus 100.

As described above, the gateway apparatus 100 functions as a packet data network gateway (PGW1 or PGW2) for the MEC server 300 (MEC Server 1 or MEC Server 2). Hence, the packet data network gateway, which is an EPC session anchor, is constituted of two stages of gateway in total including PGW0 for the Internet and a PGW (e.g., PGW1 or PGW2 or a function of the gateway apparatus 100) for the MEC server 300.

With such a configuration, for example, when the terminal apparatus (UE) reaches an MEC area 1, the terminal apparatus (UE) can access a service provided by the MEC Server 1. Here, PGW0 for the Internet recognizes move of the terminal apparatus (UE) as handover based on an SGW change (e.g., a change from SGW0 to SGW1). In other words, since a change in configuration of a PDN session due to a PGW change is not necessary, IP address reallocation to the terminal apparatus (UE) and the like are not performed, and hence no influence on the service occurs.

More specifically, for example, when a destination IP address of a user packet is checked by a DPI provided in PGW1 and the destination IP address is an IP address destined for the MEC Server 1, the gateway apparatus 100 functioning as a gateway for the MEC Server 1 operates as a PGW (PGW1) for the MEC Server 1. In contrast, when the destination IP address is not an IP address destined for the MEC Server 1, the gateway apparatus 100 operates as an SGW (SGW1) to transfer data included in the user packet to a PGW (PWG0) for the Internet via the S5 interface. With such an operation, the terminal apparatus (UE) can receive the service provided by the MEC Server 1 while maintaining connectivity with PGW0. In other words, the PGW (PGW1) for the MEC Server 1 can conceal the operation as an anchor when being seen from existing facilities (e.g., PGW0) and the like. In other words, since a reconfiguration of a session with the PGW is not necessary, IP address reallocation to the terminal apparatus (UE) is not performed, and this brings an advantage of having no influence on an application service.

Here, in the MEC area 1, an S5 reference point has a cascade configuration consisted of PGW0 and PWG1. The SGW (SGW1) to which the terminal apparatus (UE) is connected in MEC area 1 can treat the PGW (PGW1) for the MEC Server 1 as being included in the SGW (SGW1). For this reason, the set of PGW1 and SGW1 may be referred to as a TGW (tandem GW, transit GW). End user IP address provided by PGW0 for the Internet can be used by PGW1 for the MEC Server 1. PGW1 for the MEC Server 1 may perform network address translation (NAT) at an application layer level.

PGW1 for the MEC Server 1 operates with mobility control in C-Plane and can hence transmit a downlink packet from PGW0 to the terminal apparatus (UE). As facilities for the MEC Server 1, MME1, SGW1, and PGW1, i.e., the gateway apparatus 100, are provided. Hence, no addition of functions to existing facilities is needed, and this is advantageous in that introduction of services by MEC is easy.

(2) Tracking Area Update

Figure 4:
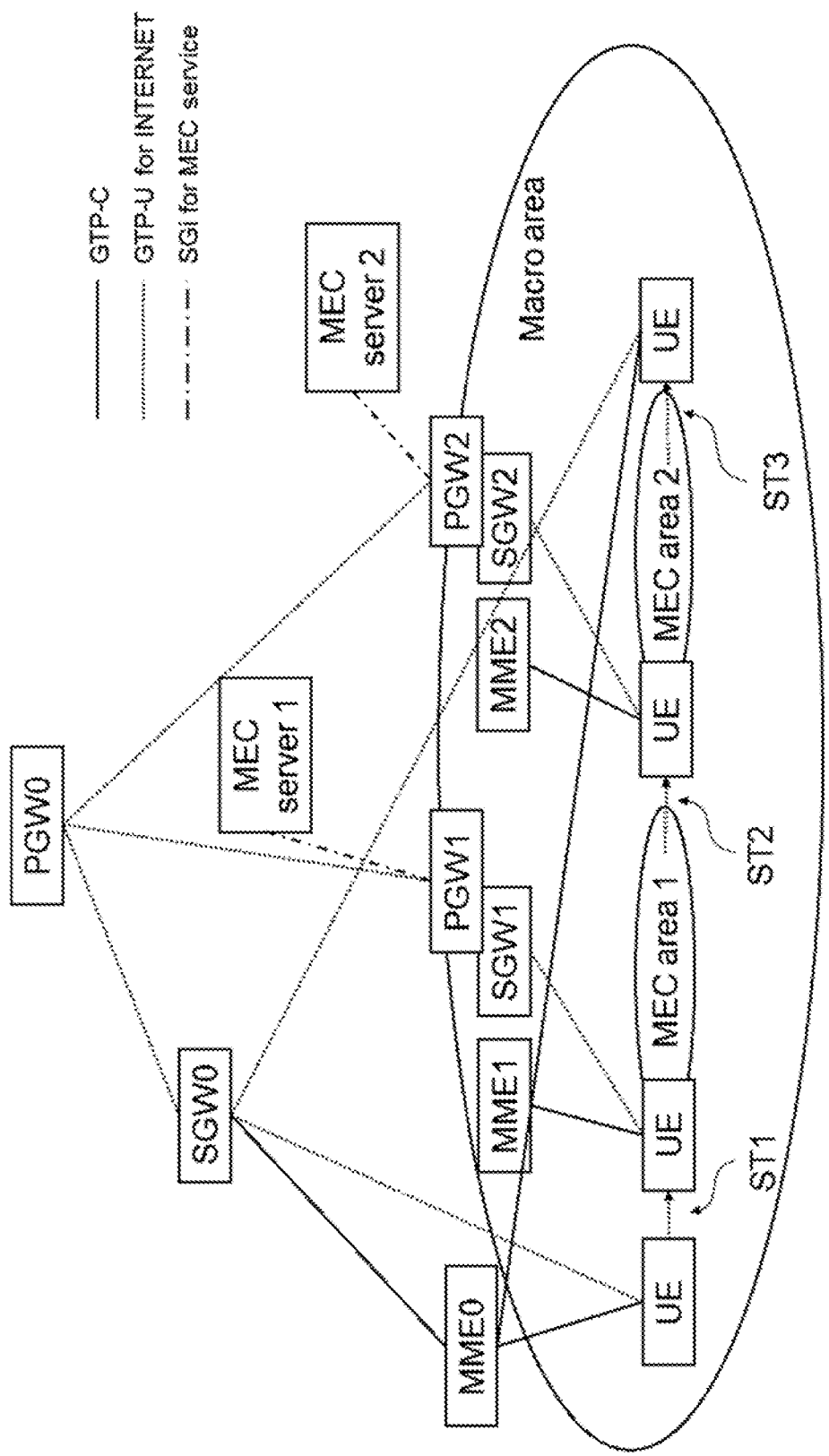
FIG. 4 is a diagram schematically illustrating a flow of operations of each network node in the EPC network.
Figure 5:
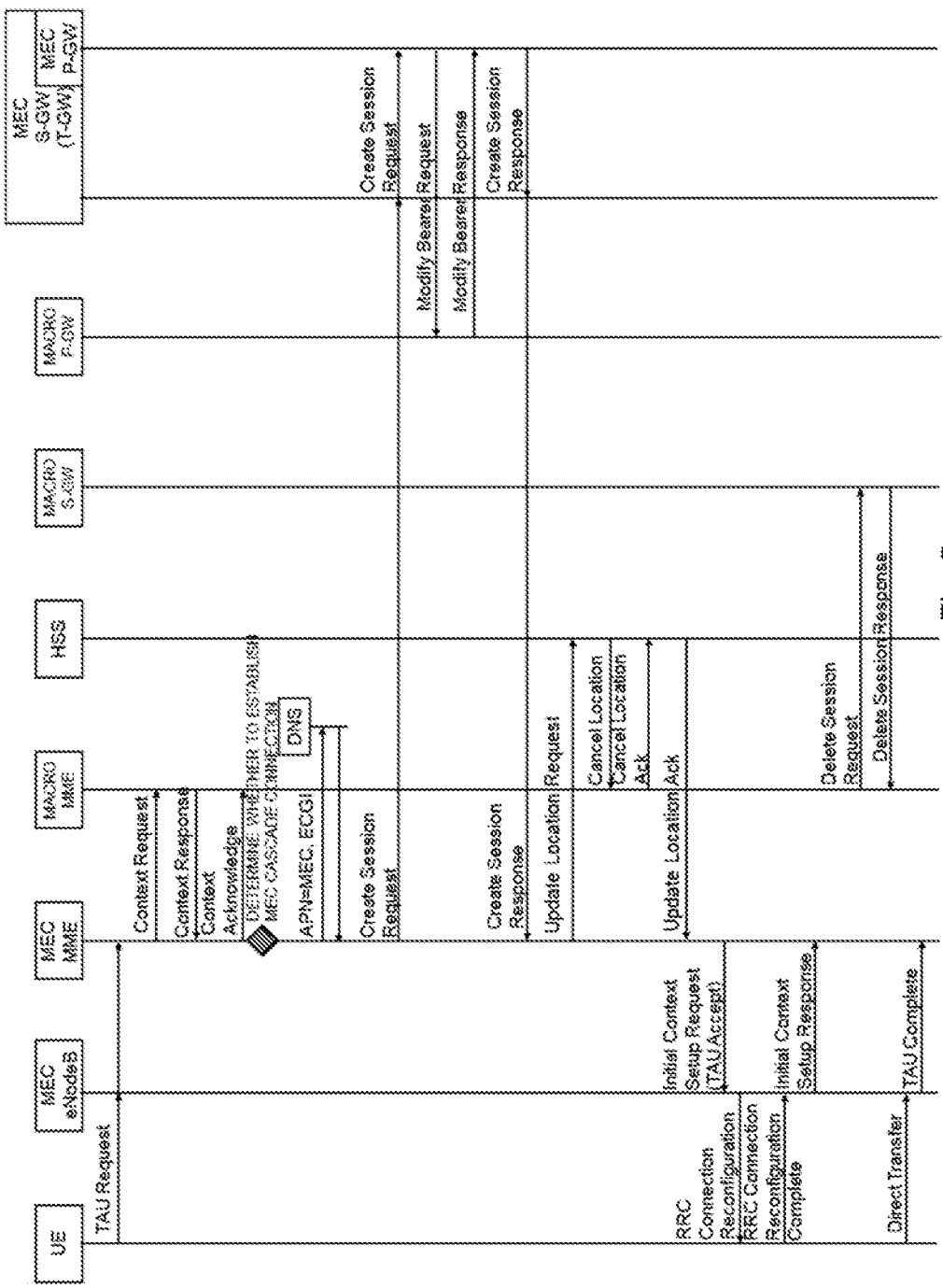
FIG. 5 is a sequence diagram for illustrating a procedure of tracking area update.

Next, with reference to FIGS. 4 and 5, tracking area update performed at the time when the terminal apparatus (UE) moves will be described. FIG. 4 is a diagram schematically illustrating a flow of operations of each network node in the EPC network. FIG. 5 is a sequence diagram for illustrating a procedure of the tracking area update.

(Move from Macro Area to MEC Area 1: ST1)

When the terminal apparatus (UE) moves from Macro area to MEC area 1 to connect to the base station (eNodeB) in MEC area 1, a change in tracking area over TAI lists occurs, and hence TAU with MME and SGW change are initiated.

In this case, the MME (MME1) for the MEC Server 1 performs configuration of DNS so as to recognize only the SGW (SGW1) for the MEC Server 1. The SGW (SGW1) for the MEC Server 1 transmits a Modify Bearer Request to the PGW (e.g., PGW0) to which the terminal apparatus (UE) used to be connected. Consequently, a change in configuration of the S5 interface is executed.

(Move from MEC Area 1 to MEC Area 2: ST2)

When the terminal apparatus (UE) moves from MEC area 1 to MEC area 2 to connect to the base station (eNodeB) in MEC area 2, a change in tracking area over TAI lists occurs, and hence TAU with MME and SGW change are initiated.

In this case, the MME (MME2) for the MEC Server 2 performs configuration of DNS so as to recognize only the SGW (SGW2) for the MEC Server 2. The SGW (SGW2) for the MEC Server 2 transmits a Modify Bearer Request to the PGW (e.g., PGW0) to which the terminal apparatus (UE) used to be connected. Consequently, a change in configuration of the S5 interface is executed.

(Move from MEC Area 2 to Macro Area: ST2)

When the terminal apparatus (UE) moves from MEC area 2 to Macro area to connect to the base station (eNodeB) in Macro area, a change in tracking area over TAI lists occurs, and hence TAU with MME and SGW change are initiated.

In this case, an SGW to which the terminal apparatus (UE) is to be connected may be any SGW (e.g., SGW0, SGW1, or SGW2). SGW0 transmits a Modify Bearer Request to the PGW (e.g., PGW0) to which the UE used to be connected. Consequently, a change in configuration of the S5 interface is executed.

Effects

According to the present example, it is possible to provide the MEC service without changing the IP address of the terminal apparatus (UE). Moreover, according to the present example, it is possible to use PGW0 for Macro area without changing the configuration of a PDN session in the PGW (e.g., PGW1 or PGW2) for the MEC service, to connect to the MEC Server 1 or 2. In other words, the terminal apparatus (UE) can receive the MEC service without changing the configuration related to APN for the Internet.

It requires time and effort and therefor burdensome for a user to configure APN for the MEC service in order to configure a bearer for the MEC service. However, according to the present example, DPI provided in the PGW for the MEC service (e.g., PGW1 or PGW2) checks the destination IP address of a user packet to perform transfer processing to the MEC server 3 only when the user packet is for the MEC service. Hence, APN can provide the MEC service to the terminal apparatus (UE) with a configuration for the Internet.

Moreover, according to the present example, the MEC service to be provided can use all kinds of mobility control of the EPC including downlink. As a comparative example, in a case that a DPI apparatus is provided in an S1 section, it is possible to check the destination IP address of a user packet and transfer only the user packet to the MEC server only when the user packet is for the MEC service, to thereby enable sorting, while it is not possible to find out the location of the UE. Hence, downlink from the MEC service to the UE is not possible. In contrast, in the present example, for example, the set of MME1, SGW1, and PGW1, i.e., the gateway apparatus 100, is provided as facilities for the MEC service, and this enables the use of all kinds of mobility control by EPC. This allows an operator to easily introduce facilities for the MEC service. For example, the connection points of the set of MME1, SGW1, and PGW1, i.e., the gateway apparatus 100 with existing facilities can be gathered only at points S10 and S5.

(3) Other Examples

Figure 6:
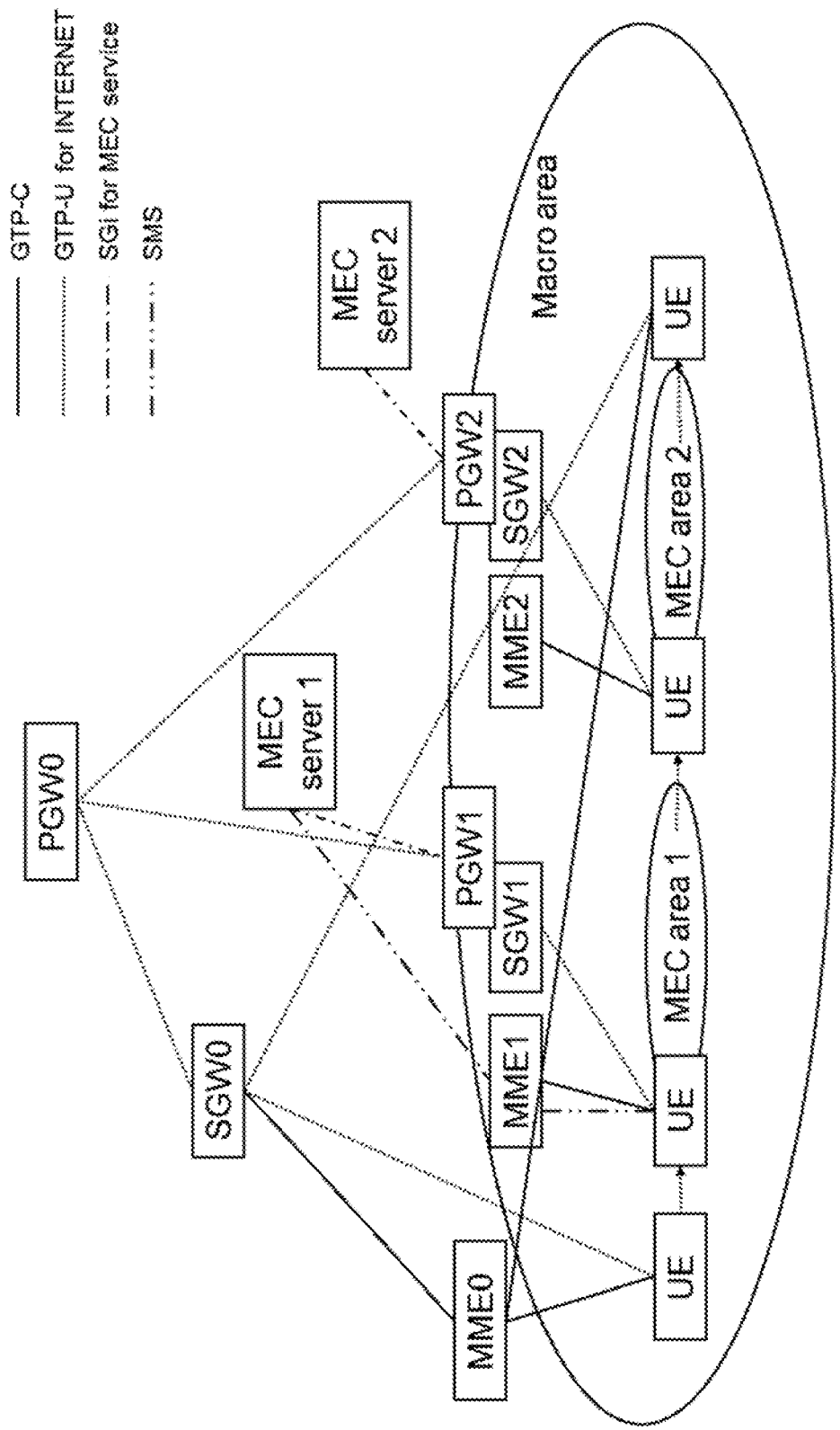
FIG. 6 is a diagram illustrating an example of a schematic configuration of an EPC network according to another example.

FIG. 6 is a diagram illustrating an example of a schematic configuration of an EPC network according to another example. As illustrated in FIG. 6, the gateway apparatus 100 functioning as an MME (MME1 or MME2) is included as facilities for the MEC service. This makes it possible to notify a terminal apparatus (UE) reaching MEC area 1 or MEC area 2 of a short message service (SMS) via the MME for the MEC service (gateway apparatus 100). In other words, the terminal apparatus (UE) located in the MEC area can recognize that the terminal apparatus (UE) can use the MEC service. In this case, the MME for the MEC service (MME1 or MME2) checks a mobile country code (MCC) to thereby be able to select an MEC server corresponding to the country of each user and make an SMS notification corresponding language of the user.

By identifying a terminal capability and terminal contract, the MME for the MEC service (MME1 or MME2) may determine whether the MEC service is supported and reject a request of tracking area update from the terminal apparatus (UE). In this way, the MME for the MEC service (MME1 or MME2) can perform control so as not to provide the MEC service to the terminal apparatus (UE).

4. Second Example Embodiment

Figure 7:
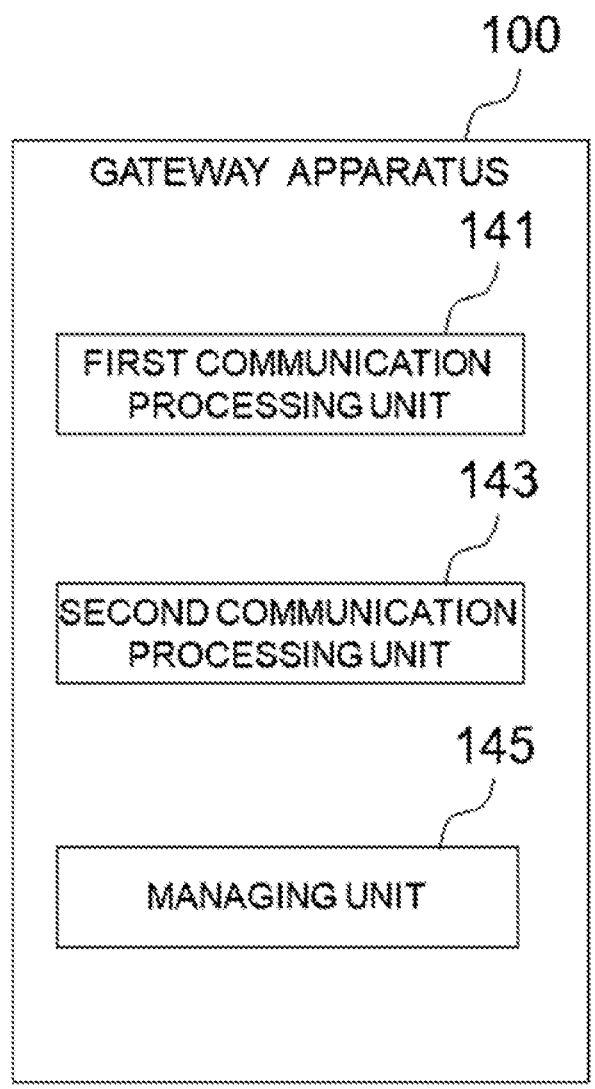
FIG. 7 is a block diagram illustrating an example of a schematic configuration of a gateway apparatus 100 according to a second example embodiment.

Next, with reference to FIG. 7, a description will be given of a second example embodiment of the present invention. The above-described first example embodiment is a concrete example embodiment, whereas the second example embodiment is a more generalized example embodiment.

4.1. Configuration of Gateway Apparatus 100

First, with reference to FIG. 7, an example of a configuration of a gateway apparatus 100 according to the second example embodiment will be described. FIG. 7 is a block diagram illustrating an example of a schematic configuration of the gateway apparatus 100 according to the second example embodiment. With reference to FIG. 7, the gateway apparatus 100 includes a first communication processing unit 141, a second communication processing unit 143, and a managing unit 145. Concrete operations of the first communication processing unit 141, the second communication processing unit 143, and the managing unit 145 will be described later in detail.

The first communication processing unit 141, the second communication processing unit 143, and the managing unit 145 may be implemented with the same processor or may be implemented with separate processors. The first communication processing unit 141, the second communication processing unit 143, and the managing unit 145 may include a memory configured to store a program (instructions) and one or more processors that can execute the program (instructions), and the one or more processors may perform operations of the first communication processing unit 141, the second communication processing unit 143, and the managing unit 145. The program may be a program for causing the processor(s) to perform operations of the first communication processing unit 141, the second communication processing unit 143, and the managing unit 145.

Note that each of the above-described processors may, for example, be a virtual processor implemented with a hypervisor installed in a general-purpose computer or the like. Moreover, the above-described memory or memories may, for example, be a virtual memory implemented with a hypervisor installed in a general-purpose computer or the like.

4.2. Technical Features

Next, technical features of the second example embodiment will be described.

In the second example embodiment, the gateway apparatus 100 (first communication processing unit 141) performs communication with a packet data network gateway 200 configuring an address for a terminal apparatus (e.g., the terminal apparatus 500) in an EPC network. The gateway apparatus 100 (second communication processing unit 143) performs communication with the MEC server 300 providing the MEC service. The gateway apparatus 100 (managing unit 145) manages information related to an address of the MEC server 300.

The gateway apparatus 100 (first communication processing unit 141) transfers data between the terminal apparatus (e.g., the terminal apparatus 500) and the packet data network gateway 200 when a destination address of data for the terminal apparatus (e.g., the terminal apparatus 500) is an address other than an address of the MEC server 300. The gateway apparatus 100 (second communication processing unit 143) transfers data between the terminal apparatus (the terminal apparatus 500) and the MEC server 300 when a destination address of data for the terminal apparatus (e.g., the terminal apparatus 500) is the address of the MEC server.

For example, the first communication processing unit 141 may perform operations of the above-described first communication processing unit 131 according to the first example embodiment. The second communication processing unit 143 may perform operations of the second communication processing unit 133 according to the above-described first example embodiment. The managing unit 145 may further perform operations of the managing unit 135 according to the above-described first example embodiment.

The second example embodiment has been described above. According to the second example embodiment, it is possible, for example, to appropriately provide, to a terminal apparatus, both a service via a packet data network gateway and a service by MEC in an EPC network.

5. Other Example Aspects

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily carried out in time series in the order described in the corresponding sequence diagram. For example, the steps in the processing may be carried out in an order different from that described in the corresponding sequence diagram or may be carried out in parallel. Some of the steps in the processing may be deleted, or more steps may be added to the processing.

An apparatus including constituent elements (e.g., the first communication processing unit, the second communication processing unit, and/or the managing unit) of the gateway apparatus described in the Specification (e.g., one or more apparatuses (or units) among a plurality of apparatuses (or units) constituting the gateway apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer-readable recording media (non-transitory computer readable media) having recorded thereon the programs may be provided. It is apparent that such apparatuses, modules, methods, programs, and non-transitory computer-readable recording media are also included in the present invention.

The whole or part of the example embodiments disclosed above can be described as, but not limited to, the following supplementary notes.

(Supplementary Note 1)

A gateway apparatus comprising:

a first communication processing unit configured to perform communication with a packet data network gateway configuring an address for a terminal apparatus in an Evolved Packet Core (EPC) network;

a second communication processing unit configured to perform communication with an MEC server providing a service by Mobile Edge Computing (MEC); and a managing unit configured to manage information related to an address of the MEC server; wherein the first communication processing unit is configured to transfer data between the terminal apparatus and the packet data network gateway when a destination address of data for the terminal apparatus is an address other than an address of the MEC server, and the second communication processing unit is configured to transfer data between the terminal apparatus and the MEC server when a destination address of data for the terminal apparatus is an address of the MEC server.

(Supplementary Note 2)

The gateway apparatus according to supplementary note 1, wherein the service area of the MEC server is an area identified by a tracking area identifier.

(Supplementary Note 3)

The gateway apparatus according to supplementary note 2, wherein the first communication processing unit is configured to transmit a Modify Bearer Request message to the packet data network gateway when a tracking area update request for the service area of the MEC server is received from the terminal apparatus.

(Supplementary Note 4)

The gateway apparatus according to supplementary note 3, wherein the first communication processing unit is configured to receive a Modify Bearer Response message from the packet data network gateway.

(Supplementary Note 5)

The gateway apparatus according to supplementary note 4, wherein the first communication processing unit is configured to perform communication with the packet data network gateway using an S5 interface, after receiving the Modify Bearer Response message from the packet data network gateway.

(Supplementary Note 6)

A method comprising:

performing communication with a packet data network gateway configuring an address for a terminal apparatus in an Evolved Packet Core (EPC) network;

performing communication with an MEC server providing service by Mobile Edge Computing (MEC); and managing information related to an address of the MEC server; wherein the communication with the packet data network gateway includes transferring data between the terminal apparatus and the packet data network gateway when a destination address of data for the terminal apparatus is an address other than an address of the MEC server, and the communication with an MEC server includes transferring data between the terminal apparatus and the MEC server when a destination address of data for the terminal apparatus is an address of the MEC server.

(Supplementary Note 7)

A program that causes a processor to execute:

performing communication with a packet data network gateway configuring an address for a terminal apparatus in an Evolved Packet Core (EPC) network;

performing communication with an MEC server providing service by Mobile Edge Computing (MEC); and managing information related to an address of the MEC server; wherein the communication with the packet data network gateway includes transferring data between the terminal apparatus and the packet data network gateway when a destination address of data for the terminal apparatus is an address other than an address of the MEC server, and the communication with an MEC server includes transferring data between the terminal apparatus and the MEC server when a destination address of data for the terminal apparatus is an address of the MEC server.

(Supplementary Note 8)

A non-transitory computer readable recording medium storing a program that causes a processor to execute:

performing communication with a packet data network gateway configuring an address for a terminal apparatus in an Evolved Packet Core (EPC) network;

performing communication with an MEC server providing service by Mobile Edge Computing (MEC); and managing information related to an address of the MEC server; wherein the communication with the packet data network gateway includes transferring data between the terminal apparatus and the packet data network gateway when a destination address of data for the terminal apparatus is an address other than an address of the MEC server, and the communication with an MEC server includes transferring data between the terminal apparatus and the MEC server when a destination address of data for the terminal apparatus is an address of the MEC server.

It is possible to appropriately provide, to a terminal apparatus, both a service via a packet data network gateway and a service by Mobile Edge Computing in an EPC network.

REFERENCE SIGNS LIST

1 System
100 Gateway Apparatus
131, 141 First Communication Processing Unit
133, 143 Second Communication Processing Unit
135, 145 Managing Unit
200 Packet Data Network Gateway
300 MEC Server
400 Base Station
500 Terminal Apparatus

What is claimed is:

1. A gateway apparatus comprising:
a memory storing instructions; and
one or more processors configured to execute the instructions to:
perform communication with a packet data network gateway configuring an address for a terminal apparatus in an Evolved Packet Core (EPC) network;
perform communication with an MEC server providing a service by Mobile Edge Computing (MEC); and
manage information related to an address of the MEC server; wherein
the communication with the packet data network gateway includes transferring data between the terminal apparatus and the packet data network gateway when a destination address of data for the terminal apparatus is an address other than an address of the MEC server, and the communication with the MEC server includes transferring data between the terminal apparatus and the MEC server when a destination address of data for the terminal apparatus is an address of the MEC server.

2. The gateway apparatus according to claim 1, wherein the service area of the MEC server is an area identified by a tracking area identifier.

3. The gateway apparatus according to claim 2, wherein the communication with the packet data network gateway includes transmitting a Modify Bearer Request message to the packet data network gateway when a tracking area update request for the service area of the MEC server is received from the terminal apparatus.

4. The gateway apparatus according to claim 3, wherein the communication with the packet data network gateway includes receiving a Modify Bearer Response message from the packet data network gateway.

5. The gateway apparatus according to claim 4, wherein the communication with the packet data network gateway includes performing communication with the packet data network gateway using an S5 interface, after receiving the Modify Bearer Response message from the packet data network gateway.

6. A method comprising:
performing communication with a packet data network gateway configuring an address for a terminal apparatus in an Evolved Packet Core (EPC) network;
performing communication with an MEC server providing service by Mobile Edge Computing (MEC); and
managing information related to an address of the MEC server; wherein
the communication with the packet data network gateway includes transferring data between the terminal apparatus and the packet data network gateway when a destination address of data for the terminal apparatus is an address other than an address of the MEC server, and
the communication with the MEC server includes transferring data between the terminal apparatus and the MEC server when a destination address of data for the terminal apparatus is an address of the MEC server.

7. A non-transitory computer readable recording medium storing a program that causes a processor to execute:
performing communication with a packet data network gateway configuring an address for a terminal apparatus in an Evolved Packet Core (EPC) network;
performing communication with an MEC server providing service by Mobile Edge Computing (MEC); and
managing information related to an address of the MEC server; wherein
the communication with the packet data network gateway includes transferring data between the terminal apparatus and the packet data network gateway when a destination address of data for the terminal apparatus is an address other than an address of the MEC server, and
the communication with the MEC server includes transferring data between the terminal apparatus and the MEC server when a destination address of data for the terminal apparatus is an address of the MEC server.

\* \* \* \* \*